No. 815,995. PATENTED MAR. 27, 1906.
J. WILLIAMSON & H. O'BRIEN.
HOSE COUPLING.
APPLICATION FILED MAR. 15, 1905.
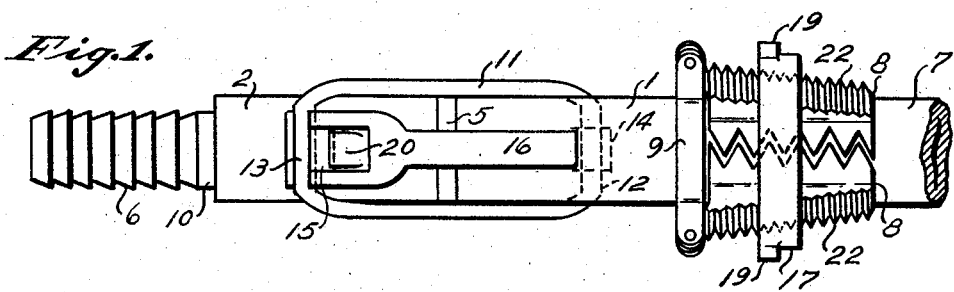
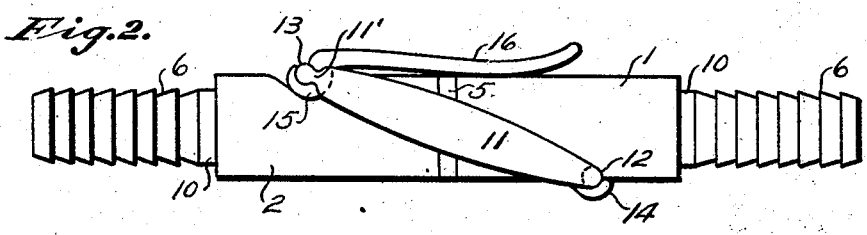
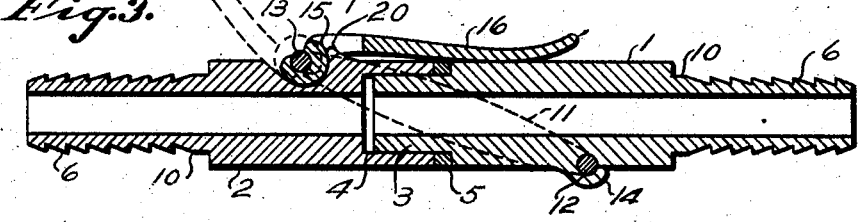
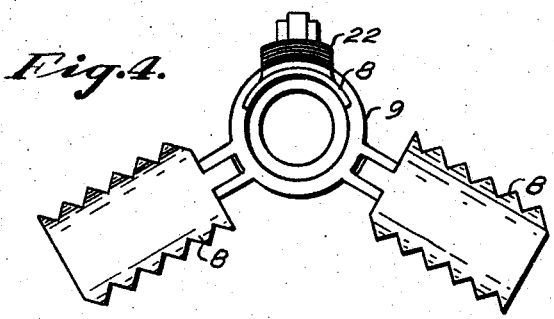 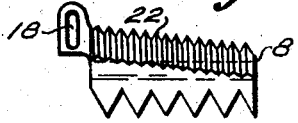
Witnesses: Inventors.
J. Williamson & H. O'Brien,
by Rummler & Rummler,
Attorneys.

UNITED STATES PATENT OFFICE.

JAMES WILLIAMSON AND HUGH O'BRIEN, OF CHICAGO, ILLINOIS.

HOSE-COUPLING.

No. 815,995.   Specification of Letters Patent.   Patented March 27, 1906.

Application filed March 15, 1905. Serial No. 250,274.

*To all whom it may concern:*

Be it known that we, JAMES WILLIAMSON and HUGH O'BRIEN, citizens of the United States of America, and residents of Chicago, in the county of Cook and State of Illinois, have invented certain new and useful Improvements in Hose-Couplings, of which the following is a specification.

This invention relates to hose-couplings; and its main object is to provide a device of this class which will require but little machine-work in its construction, which will be simple, efficient, and inexpensive, and which will permit of quickly and securely connecting together the adjacent ends of sections of hose, insuring a thoroughly water-tight joint. This object is accomplished by the device shown in the accompanying drawings, in which—

Figure 1 is a plan view of a hose-coupling constructed according to our invention, the hose being omitted from one end to show the structure of the nipple. Fig. 2 is a side elevation of the same. Fig. 3 is a longitudinal section of the same, the dotted lines indicating the position of the clamp when the cam is released to permit the link to be thrown up for disconnection of the nipples. Fig. 4 is an end elevation of one set of the clamp-jaws which secure the hose upon the nipples, showing the ring which connects said jaws. Fig. 5 is a side elevation of one of the clamp-jaws removed from the ring.

In the form shown in the drawings our coupling consists of two tubular nipples 1 and 2, fitting together endwise of each other and provided with means for insuring a water-tight joint between the adjacent ends of said nipples and between each nipple and its respective hose-section.

The nipple 1 is reduced in diameter at 3 to form a part telescoping within the counterbored end 4 of the nipple 2. The joint between the nipples is packed by a gasket 5, which is slipped over the reduced part 3 of the nipple 1. The opposite ends 6 of the nipples are also reduced in diameter somewhat and are serrated by a series of annular grooves and ridges. These parts 6 fit within the interior of the hose 7, and the hose is securely clamped against the parts 6 by means of a plurality of jaws 8, which are disposed longitudinally of the nipple and connected together at their inner ends by means of a collar 9. The collar 9 is formed to fit the part 10 of the nipple at the inner end of the serrated part 6 and is preferably made separate from the nipple for convenience and for the purpose of reducing the cost of construction.

The nipples 1 and 2 are secured together by means of a link 11, which extends diagonally across the joint between the nipples. The side parts of the link are flat, so as to lie closely to the periphery of the nipples, and the end parts 12 and 13 are parallel to each other and engage sockets in opposite nipples. The part 12 is permanently held in pivotal engagement with its socket by a lug 14, which is bent around the part 12 when the device is first assembled. A cam 15 is eccentrically mounted on the part 13 of the link and is provided with an operating-lever 16. The cam only partly encircles the part 13 of the link, and one side part of the link is contracted at 11' to permit the link and cam to be slid apart when turned to certain relative positions, as in the well-known joints of link belting. The outer surface of the cam 15 fits the socket in the nipple 2. This socket is formed partly in the wall of the nipple and partly on the face of a lug 20. The cam 15 is so formed that when the lever 16 is in the position shown in Fig. 2 the center of the part 13 will lie in such relation to the line of pressure that the pull on the link tends to hold the lever in the position shown in Fig. 2. When the lever 16 is moved to the position which is indicated by dotted lines in Fig. 3, the cam 15, through its eccentric connection with the link, assumes a position which will permit it to clear the lug 20 and allow the link to be swung in the direction of the arrow 21. The nipples may now be freely separated.

The jaws 8 are disposed longitudinally of the nipples and are in the form of longitudinal sectors having their inner surface of cylindrical form to fit against the outer surface of the hose and being wedge-shaped along their middle line in the direction of their length, the thicker end of the wedge being disposed toward the joint between the thimbles. The longitudinal edges of the jaws 8 are of zigzag formation, so that the edges of adjacent jaws will interlap with each other, as is seen in Fig. 1. Each jaw 8 has a central ridge 22, which is threaded and forms a threaded wedge, meshing with a correspondingly-threaded collar 17, which encircles and meshes with all of the jaws. Each jaw is slotted at 18 at the point of its pivotal connection with the ring 9, so as to permit both ends of the jaw to move radially inward under the wedging action of the ring 17 upon the threaded ridges 22. The ring 17 is provided with lugs 19 for engaging a spanner-wrench.

The operation of the device shown is as follows: To connect the end of a hose-section to one of the nipples, the collar 9 is first slipped over the end of the nipple. The ring 17 is then slipped over the end of the hose, and the nipple is inserted into the end of the hose. The jaws 8 are then closed down over the hose, and the ring 17 is screwed upon the threaded wedges 22 until a thoroughly watertight joint is had. The interlapping side edges of the jaws 8 cause the hose to be compressed against the nipple in such manner as to prevent the possibility of said hose being puckered between the adjacent side edges of the jaws and forming a channel for leakage along the joint between the nipple and hose. To make the connection between the two nipples, the end 3 of the nipple 1 is inserted into the end 4 of the nipple 2. The link 11 is then closed down into the socket in the nipple 2, whereupon the closing down of the lever 16 causes the cam 15 to exert an endwise pressure upon the link 11, drawing the two nipples toward each other and tightly compressing the gasket 5 between the opposed shoulders of the nipples. The cam 15 and the coacting surface of the socket are so formed that when the lever 16 is in its closed position, as in Fig. 2, the resultant pressure between the cam and socket tend to resist the lifting of the lever 16. This arrangement of the bearing-surfaces effectually prevents the accidental separation of the nipples. In the act of lifting the lever 16 to disconnect the nipples the position of the resultant pressure is shifted past the dead central position of the cam 15. When the lever 16 is moved to the position shown dotted in Fig. 3, the link 11 is free to swing away clear of the lug 20. The operations of connecting and disconnecting the nipples are so simple that they may be made with great rapidity.

It will be seen that numerous details of the construction shown may be altered without departing from the spirit of our invention.

What we claim as our invention, and desire to secure by Letters Patent, is—

1. In a coupling of the class described, the combination of a thimble for entering one end of a hose; a plurality of pivotally-connected jaws mounted on said thimble and adapted to lie longitudinally of the thimble and against the exterior surface of the hose, said jaws having inner concave surfaces fitting the hose and having their longitudinal side edges formed to interlap with each other; and means for forcing said jaws inwardly for clamping the hose against the thimble, substantially as described.

2. In a coupling of the class described, the combination of a thimble for entering one end of a hose; a plurality of pivotally-connected jaws mounted on said thimble and adapted to lie longitudinally of the thimble and against the exterior surface of the hose, said jaws having inner concave surfaces fitting the hose and having their longitudinal side edges formed to interlap with each other, and each of said jaws being wedge-shaped in longitudinal section; and a collar surrounding said jaws and adapted to force the same inwardly for clamping the hose against the thimble, substantially as described.

3. In a coupling of the class described, the combination of a thimble for entering one end of a hose; a plurality of pivotally-connected jaws mounted on said thimble and adapted to lie longitudinally of the thimble and against the exterior surface of the hose, said jaws having inner concave surfaces fitting the hose and having their longitudinal side edges formed to interlap with each other, and each of said jaws being wedge-shaped in longitudinal section; and a collar surrounding said jaws and having threaded engagement therewith, whereby said collar when rotated in one direction will move toward the thicker end of said jaws and force said jaw inwardly for clamping the hose against the thimble, substantially as described.

4. In a coupling of the class described, the combination of a thimble for entering one end of a hose; a ring-shaped member loosely mounted on said thimble and having thereon a plurality of pairs of radially-disposed lugs; a plurality of jaws each respectively pivoted to one of said pairs of lugs and adapted to lie longitudinally of the thimble and against the exterior surface of the hose, said jaws having inner concave surfaces fitting the hose and having their longitudinal side edges formed to interlap with each other, said jaws being wedge-shaped in longitudinal section and thicker toward their pivoted ends, and having a threaded outer surface and a collar fitting around said jaws and having a threaded interior surface adapted to coact with the threads on said jaws for forcing said jaws inwardly to clamp the hose against said nipple, substantially as described.

5. In a coupling of the class described, the combination of a pair of thimbles having separable interlocking endwise engagement with each other, and each having a part adapted to enter the end of a hose; each of said thimbles having mounted thereon a plurality of pivotally-connected jaws adapted to lie longitudinally of such thimble and against the exterior surface of the hose, said jaws having inner concave surfaces fitting the hose and having their longitudinal side edges formed to interlap with each other; and means for forcing said jaws inwardly for clamping the hose against the thimbles, substantially as described.

Signed at Chicago this 11th day of March, 1905.

JAMES WILLIAMSON.
HUGH O'BRIEN.

Witnesses:
WM. R. RUMMLER,
RUDOW RUMMLER.